United States Patent
Lipcsei et al.

(10) Patent No.: US 7,659,702 B2
(45) Date of Patent: Feb. 9, 2010

(54) BUCK TOPOLOGY ALLOWING STEP-UP AND POLARITY CHANGE

(75) Inventors: Laszlo Lipcsei, Campbell, CA (US);
Serban Popescu, Campbell, CA (US);
Sorin Hornet, Milpitas, CA (US)

(73) Assignee: O2Micro International Limited, Grand Cayman (KY)

( * ) Notice: Subject to any disclaimer, the term of this patent is extended or adjusted under 35 U.S.C. 154(b) by 321 days.

(21) Appl. No.: 11/731,698

(22) Filed: Mar. 29, 2007

(65) Prior Publication Data
US 2007/0285066 A1 Dec. 13, 2007

Related U.S. Application Data

(60) Provisional application No. 60/797,984, filed on May 5, 2006.

(51) Int. Cl.
*G05F 1/59* (2006.01)

(52) U.S. Cl. ...................................... 323/271; 323/282
(58) Field of Classification Search ................. 323/271, 323/282
See application file for complete search history.

(56) References Cited

U.S. PATENT DOCUMENTS 6,813,173 B2 * 11/2004 Lipcsei ......................... 363/98
2008/0049478 A1 * 2/2008 Wong et al. .................. 363/132

* cited by examiner

*Primary Examiner*—Jeffrey L Sterrett

(57) ABSTRACT

A buck topology that provides voltage step up and polarity change is disclosed. In one embodiment a converter includes an input for receiving an input voltage, a switching circuit coupled to the input for receiving a first driving signal, a floating voltage source coupled to the switching circuit for producing an offset voltage, and an output coupled to the floating voltage source for generating an output voltage. The output voltage exhibits a voltage level that is directly proportional to a duty cycle of the first driving signal.

20 Claims, 16 Drawing Sheets

BUCK TOPOLOGY ALLOWING STEP-UP AND POLARITY CHANGE

RELATED APPLICATIONS

This application claims priority to the co-pending provisional patent application, Ser. No. 60/797,984, entitled "BUCK TOPOLOGY ALLOWING STEP-UP AND POLARITY CHANGE," with filing date May 5, 2006, and assigned to the assignee of the present invention, which is herein incorporated by reference in its entirety.

TECHNICAL FIELD

This invention relates to a converter, and more particularly to a buck topology converter that provides voltage step-up or polarity change.

BACKGROUND ART

PRIOR ART FIG. 1A shows a circuit diagram of a conventional non-synchronous boost converter. The conventional non-synchronous boost converter includes an inductor 110, a switch 102, that is controlled by a pulse width modulation signal 120, a diode 106, and a capacitor 108.

PRIOR ART FIG. 1B shows signal waveforms of signals associated with the conventional non-synchronous boost converter shown in PRIOR ART FIG. 1A. PRIOR ART FIG. 1B shows the waveform 120' of the pulse width modulation signal 120, the waveform 130' of the voltage at node 130, the waveform 180' of the output voltage 180, the waveform 110' of the current through inductor 110, waveform 102' of the current through switch 102, and the waveform 106' of the current through diode 106. Furthermore, waveform 190' represents the current through a load coupled to the output 180 (not shown), and waveform 192' represents the ratio of the load current to the duty cycle of the pulse width modulation signal 120.

As shown in FIG. 1B, the current through the switch 102 (shown as the waveform 102') can be much higher than the load current (shown as the waveform 190'). In addition, in the FIG. 1B circuit, the current through the switch 102 depends on the duty cycle of the pulse width modulation signal 120. Accordingly, such conventional boost converters need a switch that is suitable for high current/heavy load applications. Such boost converters encounter stability problems when they operate in continuous conduction mode (CCM).

FIG. 2A shows a circuit diagram of a conventional buck-boost inverting converter. The conventional buck-boost converter includes an inductor 110, a switch 104 controlled by a pulse width modulation signal 120, a diode 106, and a capacitor 108.

FIG. 2B shows signal waveforms of signals associated with the conventional non-synchronous buck boost inverting converter shown in FIG. 2A. FIG. 2B shows the waveform 120' of the pulse width modulation signal 120, the waveform 130' of the voltage at node 130, the waveform 180' of the output voltage 180, the waveform 110' of the current through inductor 110, waveform 104' of the current through switch 104, and the waveform 106' of the current through diode 10,6. Referring to FIG. 2B, waveform 190' represents the current through a load coupled to the output 180 (not shown), and waveform 192' represents the ratio of the load current to the duty cycle of the pulse width modulation signal 120.

Similarly, as shown in FIG. 2B, the current through the switch 104 (shown as the waveform 104') is much higher than the load current ( by waveform 190'). The current through the switch 104 depends on the duty cycle of the pulse width modulation signal 120. Accordingly, such conventional boost converters need a switch suitable for high current/power applications.

SUMMARY OF THE INVENTION

In accordance with one embodiment of the present invention, a converter includes an input for receiving an input voltage, a switching circuit coupled to the input for receiving a first driving signal, a floating voltage source coupled to the switching circuit for producing an offset voltage, and an output coupled to the floating voltage source for generating an output voltage. The output is coupled to the floating voltage source via a filter. The output voltage exhibits a voltage level that is directly proportional to a duty cycle of the first driving signal.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

PRIOR ART

PRIOR ART

PRIOR ART

PRIOR ART

DESCRIPTION OF EMBODIMENTS

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1A:
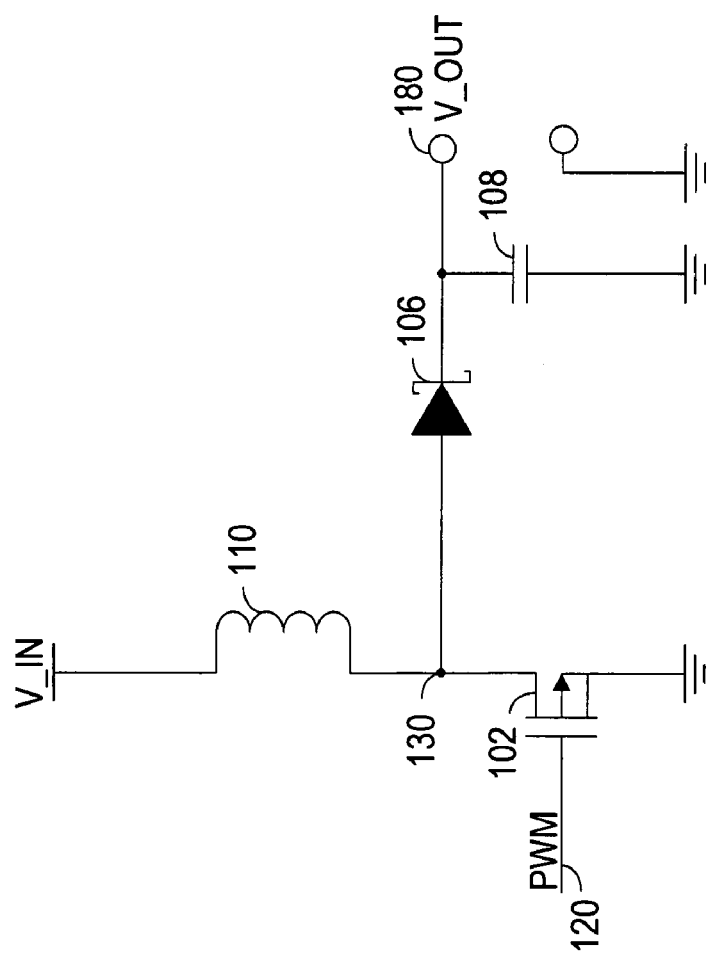
FIG. 1A shows a circuit diagram of a conventional non-synchronous boost converter, in accordance with the prior art.
Figure 1B:
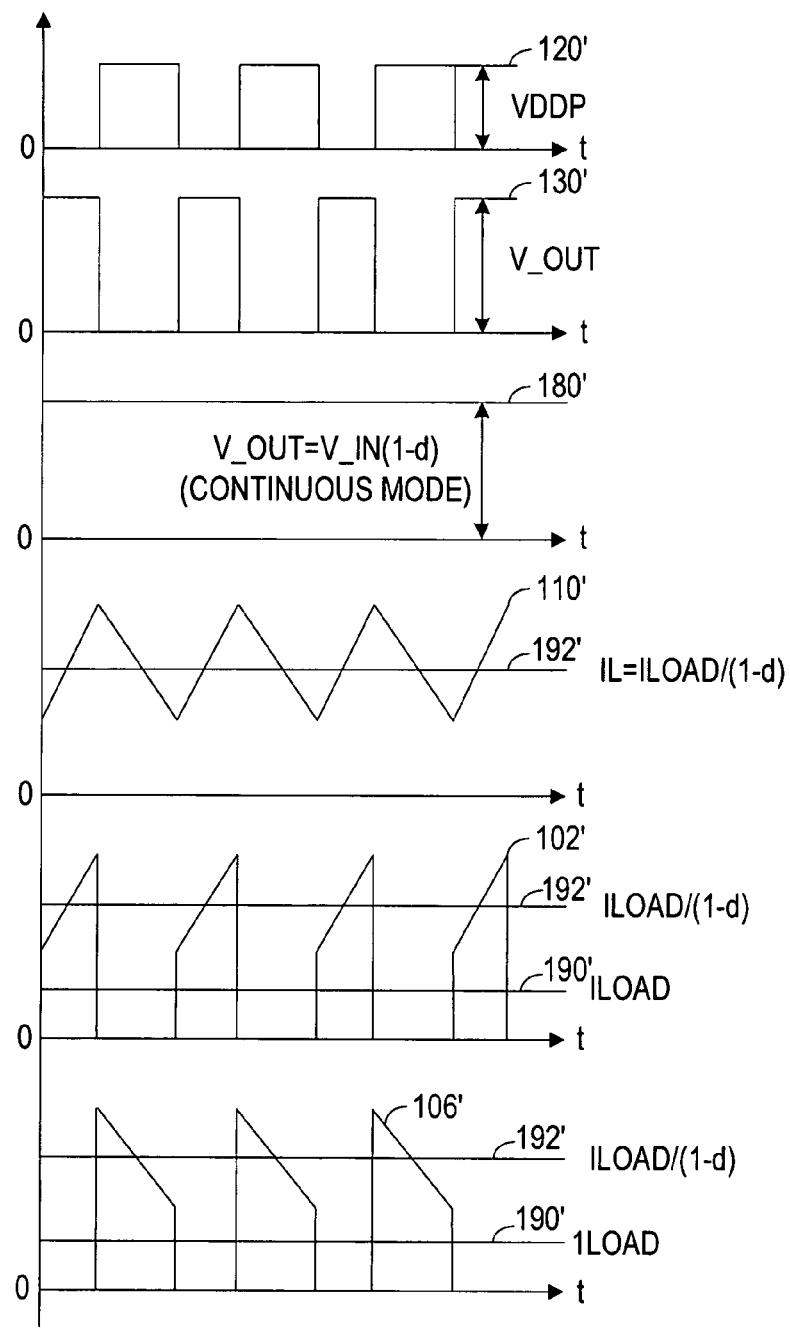
FIG. 1B shows signal waveforms of signals associated with the conventional non-synchronous boost converter in PRIOR ART FIG. 1A, in accordance with the prior art.
Figure 2A:
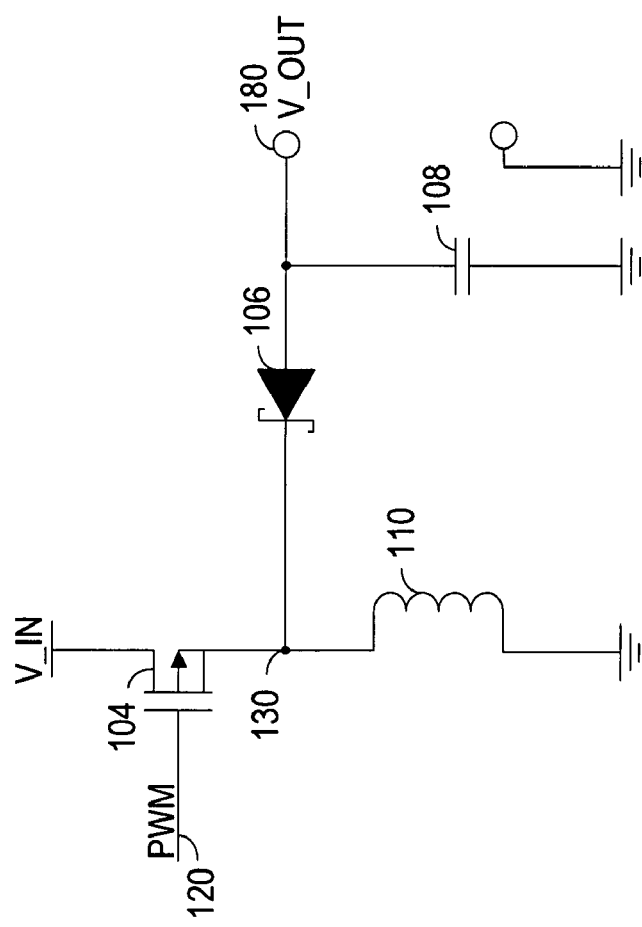
FIG. 2A shows a circuit diagram of a conventional buck-boost converter, in accordance with the prior art.
Figure 2B:
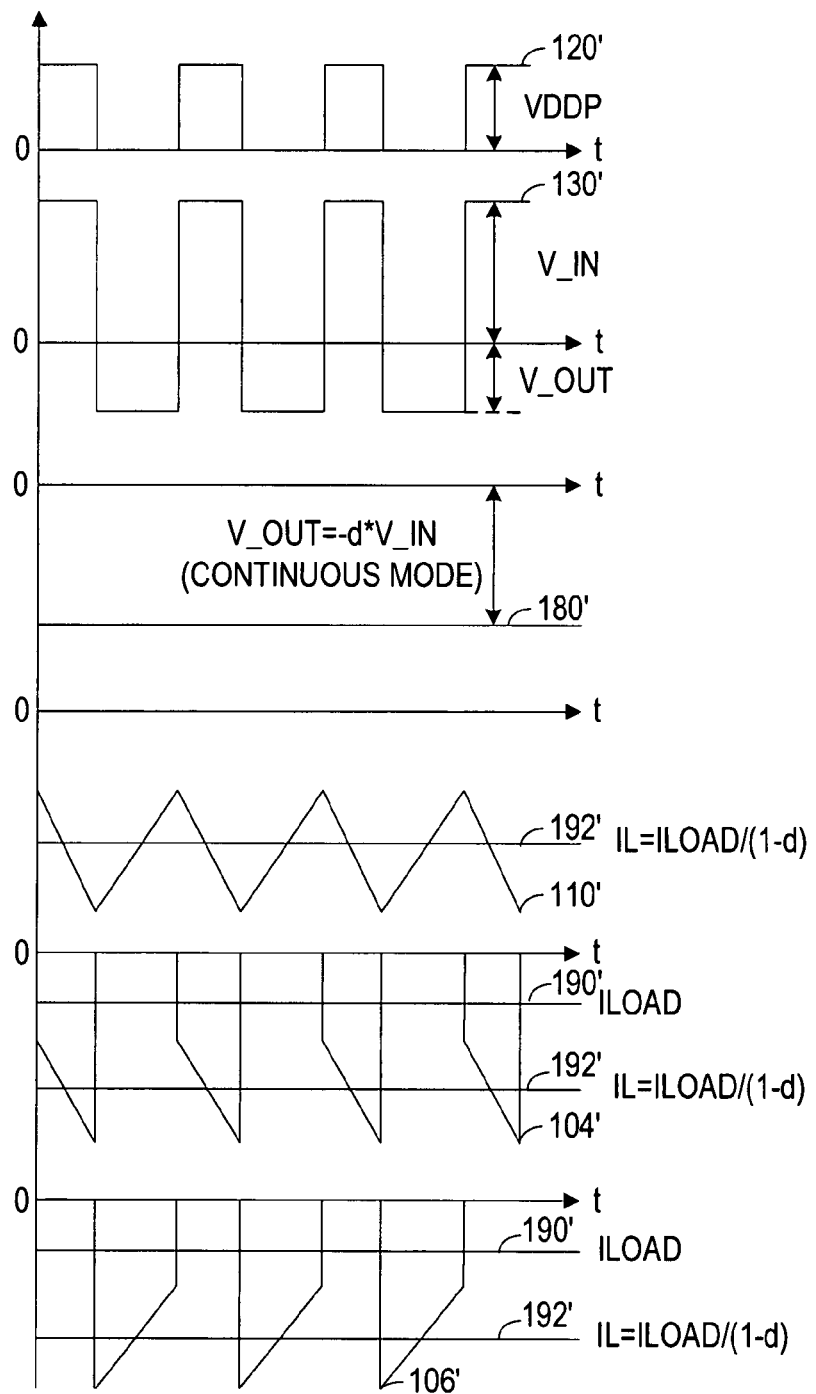
FIG. 2B shows signal waveforms of signals associated with the conventional non-synchronous boost converter in PRIOR ART FIG. 2A, in accordance with the prior art.
Figure 3A:
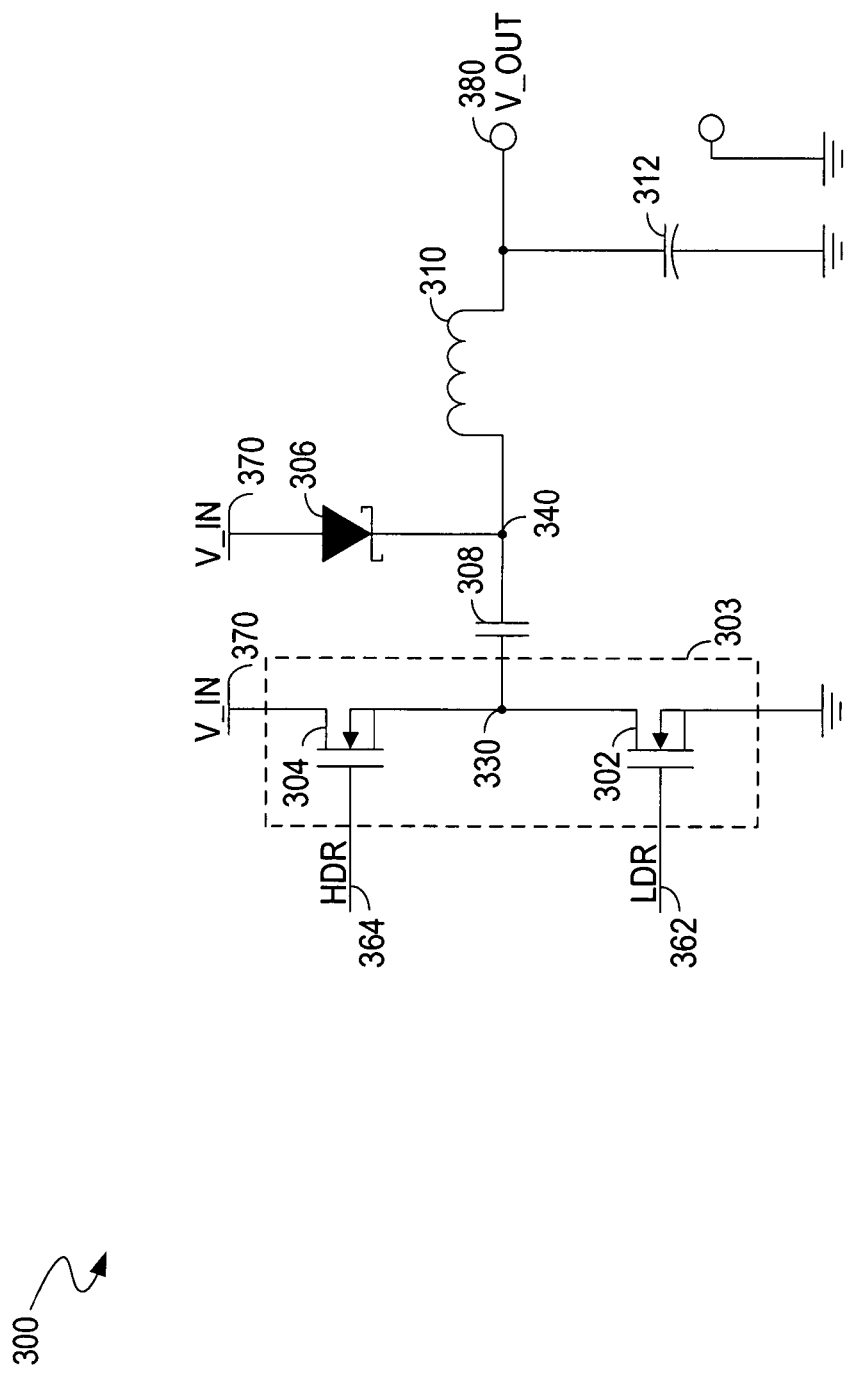
FIG. 3A shows a circuit diagram of a voltage booster, in accordance with one embodiment of the present invention.

FIG. 3A shows a circuit diagram of a voltage booster 300, in accordance with one embodiment of the present invention. The voltage booster 300 utilizes a modified buck topology with a floating voltage source to provide an output voltage that is higher than the input voltage. The stability issue encountered by conventional boost converters during continuous mode can be avoided, in one embodiment.

The voltage booster 300 comprises an input 370 for receiving an input voltage V_in, a switching circuit 303 coupled to the input 370 for receiving a first driving signal 364 and a second driving signal 362, a floating voltage source (shown as a capacitor 308) coupled to the switching circuit 303 for producing an offset voltage, and an output terminal 380 coupled to the floating voltage source (shown as the capacitor 308) for generating an output voltage V_out. The output terminal 380 is coupled to the floating voltage source 308 via a filter, in one embodiment. In one embodiment, the output voltage V_out is greater than the input voltage V_in.

Advantageously, the output voltage V_out comprises a voltage level that is directly proportional to a duty cycle of the first driving signal 364. The output voltage V_out also comprises a positive offset voltage provided by the capacitor 308, in one embodiment.

In one embodiment, the switching circuit 303 shown as a half bridge circuit comprises a high side switch 304 controlled by the first driving signal 364 and a low side switch 302 controlled by the second driving signal 362. The high side switch 304 and the low side switch 302 are coupled in series. The high side switch 304 is coupled to the input 370 and the low side switch 302 is coupled to ground. The switching circuit 303 can include different configurations with numerous modifications, in one embodiment. The high side switch 304 and the low side switch 302 are switched on alternately, in one embodiment.

The voltage booster 300 further comprises a switch shown as a diode 306 coupled to the floating source 308 for selectively coupling the floating source 308 to the input 370. As such, the offset voltage provided by the floating source 308 comprises a positive offset voltage V_in, in one embodiment.

In one embodiment, the voltage booster also comprises a LC filter shown as an inductor 310 and a capacitor 312 for smoothing the output voltage V_out.

In operation, the voltage booster 300 receives the input voltage V_in, receives the first driving signal 364, produces an offset voltage by the floating voltage source 308, and generates an output voltage V_out. The output voltage V_out comprises a voltage level that is directly proportional to the duty cycle of the first driving signal 364.

More specifically, the switching circuit 303 (shown as the half bridge circuit) receives a first driving signal 364 and a second driving signal 362. In one embodiment, the first driving signal 364 and the second driving signal 362 are pulse width modulation signals. The first driving signal 364 and the second driving signal 362 are configured to alternately switch on the high side switch 304 and the low side switch 302. As such, the node 330 is coupled to the input and ground alternately.

Advantageously, node 340 is coupled to the input 370 via a diode 306. The capacitor 308 is selectively coupled to the input 370 by the diode 306. In other words, the capacitor 308 is charged by the input voltage V_in via the diode 306. As such, the capacitor 308 coupled between node 330 and node 340 acts as a floating voltage source which provides an offset voltage. In one embodiment, the offset voltage provided by the capacitor 308 comprises positive offset voltage V_in. The capacitor 308 (floating voltage source) can provide any level of offset voltage between zero and V_in, in one embodiment.

The filter shown as the inductor 310 and the capacitor 312 smoothes the voltage at node 340 and provides the output voltage V_out at the output terminal 380, in one embodiment. The output voltage at terminal 380 is given by $V\_out=V\_in*d+V\_in$, where d represents the positive duty cycle of the first driving signal 364.

Figure 3B:
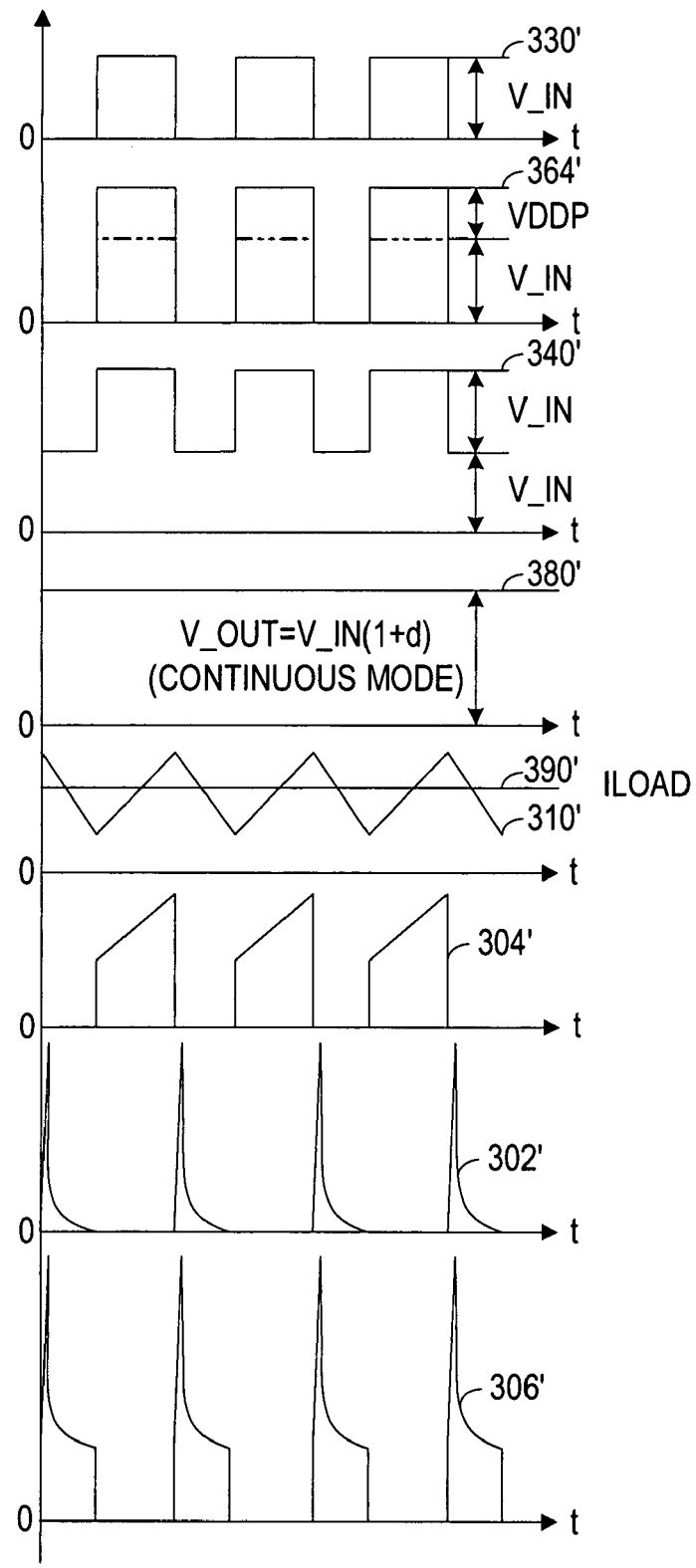
FIG. 3B shows the signal waveforms of signals associated with the voltage booster in FIG. 3A, in accordance with one embodiment of the present invention.

FIG. 3B shows the signal waveforms of signals associated with the voltage booster 300 in FIG. 3A, in accordance with one embodiment of the present invention. FIG. 3B will be described in combination with FIG. 3A.

Waveform 330' represents the voltage at node 330. Waveform 364' represents the voltage of the first driving signal 364. VDDP represents amplitude of the driving signal of the high side switch 304. Waveform 340' represents the voltage at node 340. By comparing waveform 330' and waveform 340', the voltage at node 340 (waveform 340') is equal to the voltage at node 330 (waveform 330') shifted by a positive offset voltage V_in, in one embodiment.

Waveform 380' represents the output voltage V_out at output terminal 380. As described above, the output voltage V_out is given by: $V\_out=V\_in*d+V\_in=V\_in(1+d)$, where d represents the positive duty cycle of the first driving signal 364 ($0<=d<=1$). Therefore, the output voltage V_out comprises a voltage level that is directly proportional to the duty cycle d of the first driving signal 364. In addition, the output voltage V_out comprises a positive offset voltage V_in provided by the floating voltage source 308.

Waveform 310' represents the current through the inductor 310. Waveform 390' (load current) represents the current through a load (not shown in FIG. 3A) coupled to the output terminal 380. Waveform 304' represents the current through the high side switch 304. Waveform 302' represents the current through the low side switch 302. Waveform 306' represents the current through the diode 306.

Advantageously, the current through the switches (e.g., the low side switch 302 and the diode 306) is lower (equal to the load current plus a ripple current) compared to the prior art.

Figure 4A:
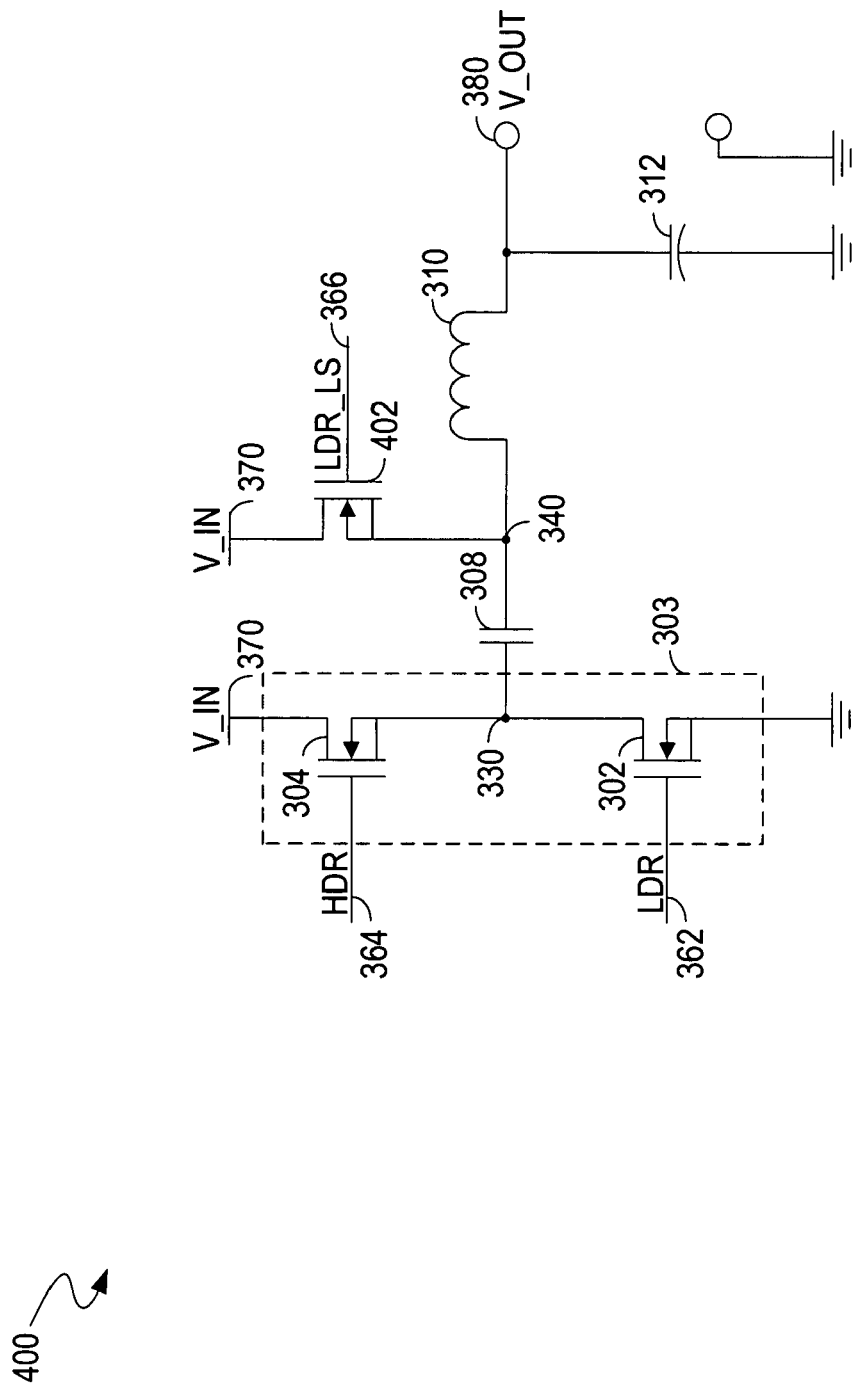
FIG. 4A shows a circuit diagram of a voltage booster, in accordance with one embodiment of the present invention.

FIG. 4A shows a circuit diagram of a voltage booster 400, in accordance with one embodiment of the present invention. Elements that are labeled the same as in FIG. 3A have similar functions and will not be repetitively described herein for purposes of brevity and clarity. The voltage booster 400 utilizes a modified buck topology with a floating voltage source to provide an output voltage that is higher than the input voltage. The stability issue encountered by conventional boost converters during continuous mode can be avoided, in one embodiment.

As shown in FIG. 4A, a switch shown as a MOSFET 402 is coupled to the floating source 308 for selectively coupling the floating source 308 to the input 370. As such, the offset voltage provided by the floating source 308 comprises a positive offset voltage V_in.

The switch 402 is controlled by a pulse width modulation control signal 366. In one embodiment, the control signal 366 and the first driving signal 364 are configured to switch on the high side switch 304 and the control switch 402 alternately. As such, the switch 402 and the low side switch 302 are switched on simultaneously, in one embodiment.

Advantageously, the MOSFET 402 can reduce conduction loss, in one embodiment. The operation of the voltage booster 400 is similar to the operation of the voltage booster 300 in FIG. 3A. Hence, the detailed operation of the voltage booster 400 will not be described herein for purposes of clarity and brevity.

Similarly, the output voltage V_out is obtained by: V_out=V_in(1+d)=V_in*d+V_in, where d represents the positive duty cycle of the first driving signal 364. Therefore, the output voltage comprises a voltage level that is directly proportional to the duty cycle d of the first driving signal 364. In addition, the output voltage V_out comprises a positive offset voltage V_in provided by the floating voltage source 308.

Figure 4B:
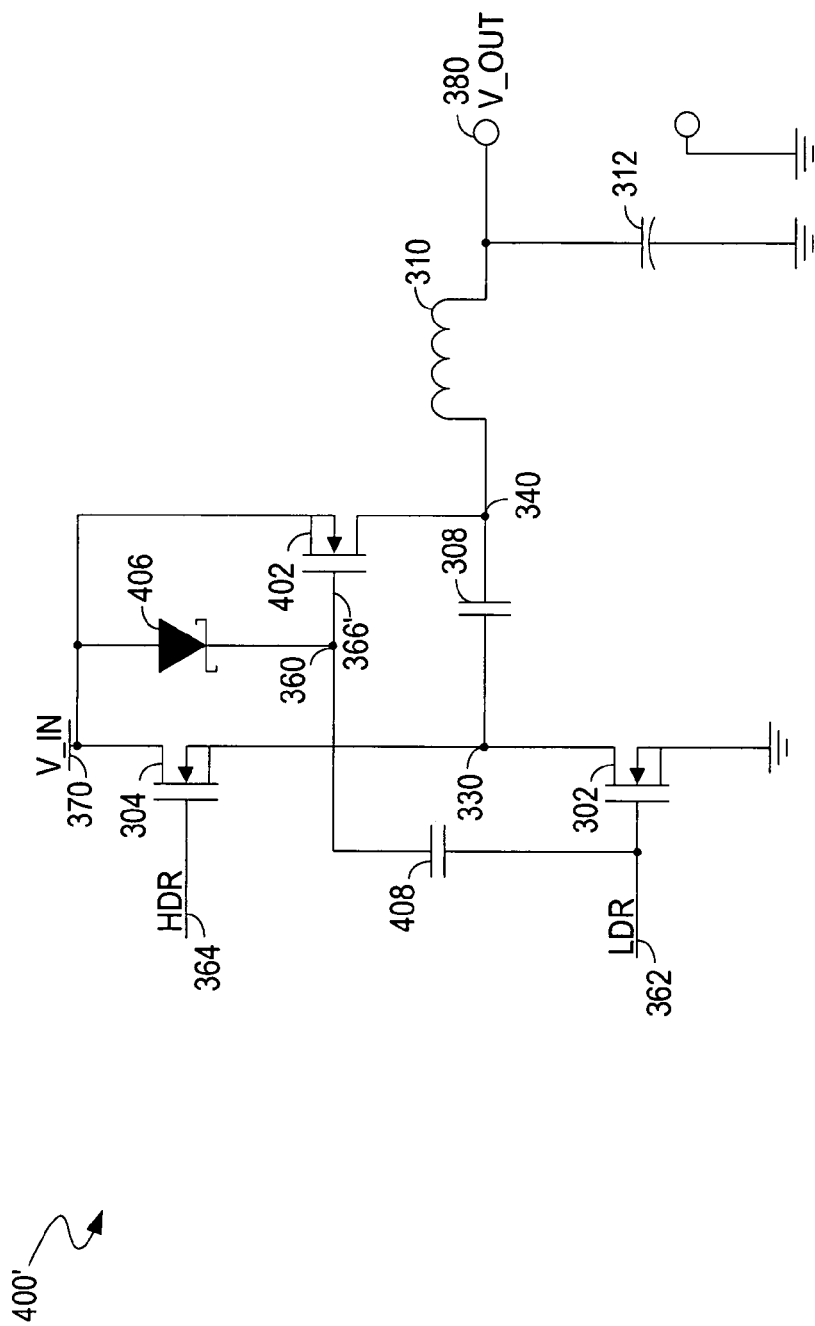
FIG. 4B shows a circuit diagram of a voltage booster, in accordance with one embodiment of the present invention.

FIG. 4B shows a circuit diagram of a voltage booster 400', in accordance with one embodiment of the present invention. Elements that are labeled the same as in FIG. 3A and FIG. 4A have similar functions and will not be repetitively described herein for purposes of brevity and clarity. The voltage booster 400' utilizes a modified buck topology with a floating voltage source to provide an output voltage that is higher than the input voltage. The stability issue encountered by conventional boost converters during continuous mode can be avoided, in one embodiment.

FIG. 4B provides a simplified control topology (level shifter) for the control switch 402. As shown in FIG. 4B, the gate terminal 360 of the control switch 402 is coupled to the second driving signal 362 via a capacitor 408 and is coupled to the input terminal 370 via a diode 406. As such, the level of the control signal 366' for the switch 402 is equal to the level of the second driving signal shifted by a positive offset voltage V_in, in one embodiment.

The high side switch 304 and the low side switch 302 are switched on alternately, in one embodiment. The low side switch 302 and the switch 402 are switched on simultaneously, in one embodiment.

The operation of the voltage booster 400' is similar to the operation of the voltage booster 300 in FIG. 3A and the voltage booster 400 in FIG. 4A. Hence, the detailed operation of the voltage booster 400' will not be described herein for purposes of clarity and brevity.

Similarly, the output voltage V_out is obtained by: V_out=V_in(1+d)=V_in*d+V_in, where d represents the positive duty cycle of the first driving signal 364. Therefore, the output voltage comprises a voltage level that is directly proportional to the duty cycle d of the first driving signal 364. In addition, the output voltage V_out comprises a positive offset voltage V_in provided by the floating voltage source 308.

Figure 4C:
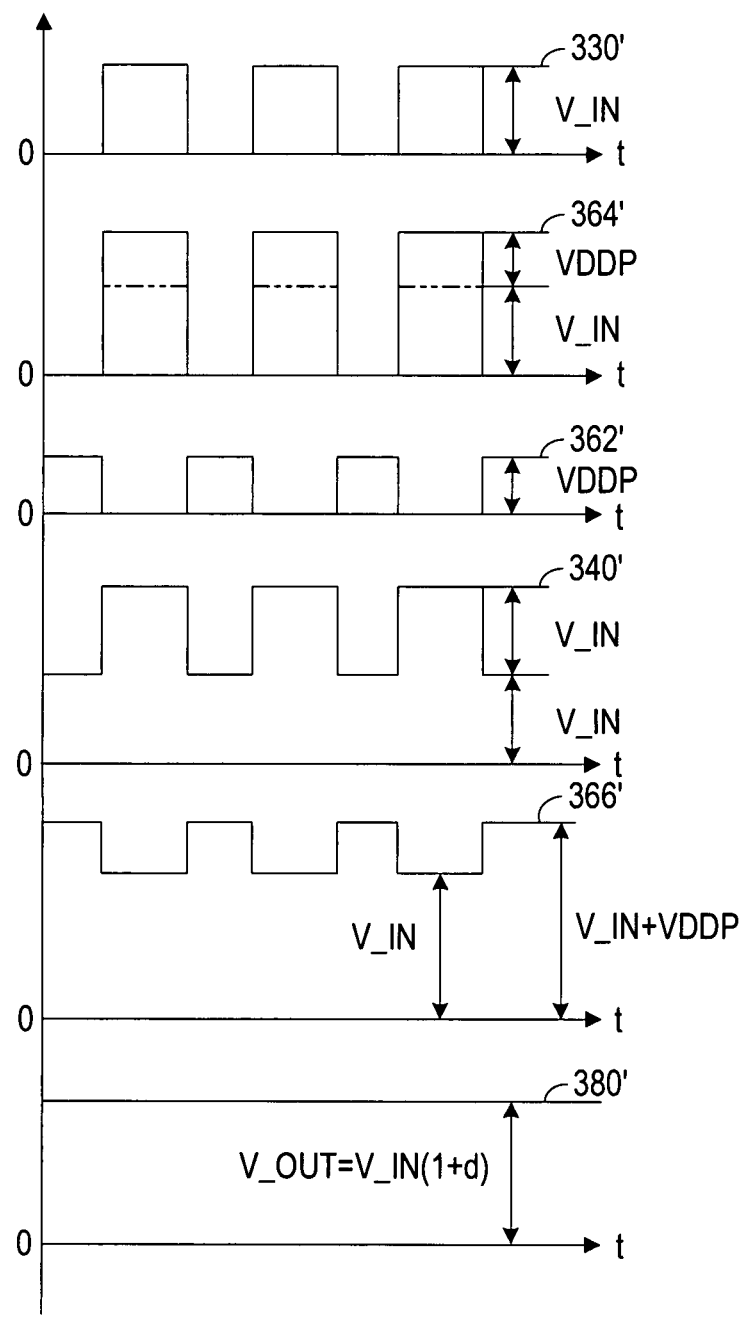
FIG. 4C shows the signal waveforms of signals associated with the voltage boosters in FIG. 4A and FIG. 4B, in accordance with one embodiment of the present invention.

FIG. 4C shows the signal waveforms of signals associated with the voltage booster 400 and the voltage booster 400', in accordance with one embodiment of the present invention.

As shown in FIG. 4C, waveform 330' represents the voltage at node 330. Waveform 364' represents the voltage of the first driving signal 364. VDDP represents the amplitude of the driving signal of the high side switch 304. Waveform 362' represents the voltage of the second driving signal 362. Waveform 340' represents the voltage at node 340. By comparing waveform 330' and waveform 340', the voltage at node 340 (waveform 340') is equal to the voltage at node 330 (waveform 330') shifted by a positive offset voltage V_in, in one embodiment.

Waveform 366' represents the voltage at node 360. As described above, the voltage at node 360 (waveform 366') is equal to the voltage of the second driving signal 362 shifted by a positive offset voltage which is V_in, in one embodiment. Waveform 380' represents the voltage at the output terminal 380. As described above, the output voltage V_out is obtained by: V_out=V_in(1+d)=V_in*d+V_in, where d represents the positive duty cycle of the first driving signal 364. Therefore, the output voltage comprises a voltage level that is directly proportional to the duty cycle d of the first driving signal 364. In addition, the output voltage V_out comprises a positive floating voltage source to provide an output voltage that is higher than the input voltage. Therefore, the stability issue encountered by conventional boost converters during continuous mode can be avoided, in one embodiment.

Furthermore, the current flowing through the switches of voltage boosters in accordance with the embodiments provided in FIG. 3A, FIG. 4A, and FIG. 4B is lower compared to the prior art. As such, voltage boosters in accordance with the present invention have high efficiency and are suitable for high current and/or heavy load applications.

Figure 5A:
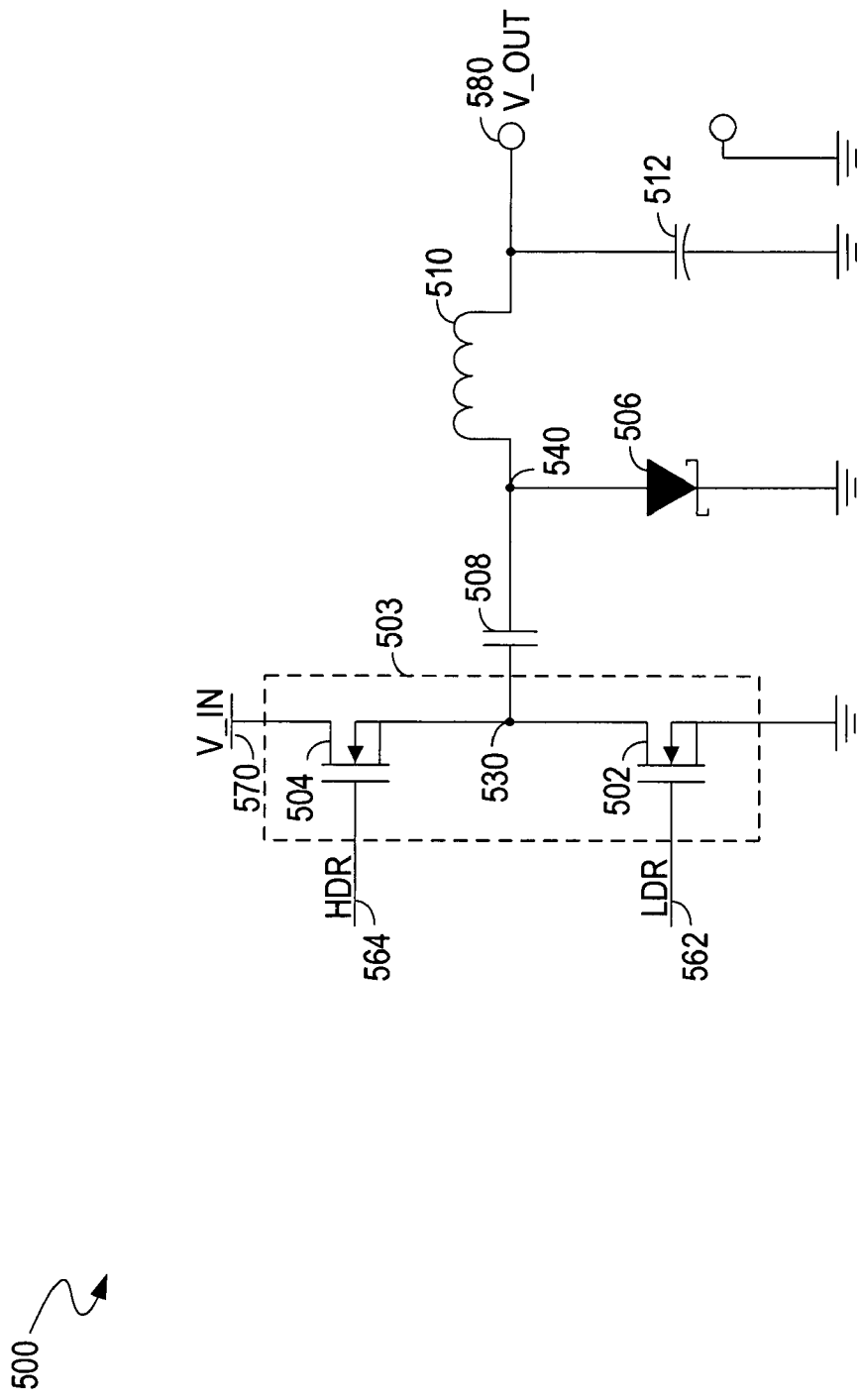
FIG. 5A shows a circuit diagram of a polarity changer, in accordance with one embodiment of the present invention.

FIG. 5A shows a circuit diagram of a polarity changer 500, in accordance with one embodiment of the present invention. The polarity changer 500 utilizes a modified buck topology with a floating voltage source to provide an output voltage. The polarity of the output voltage is opposite to the polarity of the input voltage. The stability issue encountered by conventional boost converters during continuous mode can be avoided, in one embodiment.

The polarity changer 500 comprises an input 570 receiving an input voltage V_in, a switching circuit 503 coupled to the input 570 for receiving a first driving signal 564 and a second driving signal 562, a floating voltage source (shown as a capacitor 508) coupled to the switching circuit 503 for producing an offset voltage, and an output terminal 580 coupled to the floating voltage source (shown as the capacitor 508) for generating an output voltage V_out. The output terminal 580 is coupled to the floating voltage source 508 via a filter. The polarity of the output voltage V_out is opposite to the polarity of the input voltage V_in.

Advantageously, the output voltage comprises a voltage level that is directly proportional to a duty cycle of the first driving signal 564. The output voltage also comprises an offset voltage provided by the capacitor 508, in one embodiment.

In one embodiment, the switching circuit 503 shown as a half bridge circuit comprises a high side switch 504 controlled by the first driving signal 564 and a low side switch 502 controlled by the second driving signal 562. The high side switch 504 and the low side switch 502 are coupled in series. The high side switch 504 is coupled to the input 570 and the low side switch 502 is coupled to ground. The switching circuit 503 can include different configurations with numerous modifications. The first driving signal 564 and the second driving signal 562 are configured to switch on the high side switch 504 and the low side switch 502 alternately, in one embodiment.

The voltage booster 500 further comprises a switch shown as a diode 506 coupled to the floating source 508 for selectively coupling the floating source 508 to ground. As such, the offset voltage provided by the floating source 508 comprises a negative offset voltage—V_in, in one embodiment.

In one embodiment, the voltage booster also comprises a filter shown as an inductor 510 and a capacitor 512 for smoothing the output voltage V_out.

In operation, the voltage booster 500 receives the input voltage V_in, receives the first driving signal 564, produces an offset voltage by the floating voltage source 508 and generates an output voltage V_out. The output voltage V_out comprises a voltage level that is directly proportional to the duty cycle of the first driving signal 564.

More specifically, the switching circuit 503 (shown as the half bridge circuit) receives a first driving signal 564 and a second driving signal 562. In one embodiment, the first driving signal 564 and the second driving signal 562 are pulse width modulation signals. The first driving signal 564 and the second driving signal 562 are configured to switch on the high side switch 504 and the low side switch alternately, in one embodiment. As such, by alternately conducting the high side switch 504 and the low side switch 502, the node 530 is coupled to the input and ground in an alternating fashion.

Advantageously, node 540 is coupled to ground via a diode 506. The capacitor 508 is selectively coupled to ground by the diode 506. As such, the capacitor 508 coupled between node 530 and node 540 acts as a floating voltage source which provides an offset voltage. In one embodiment, the offset voltage provided by the capacitor 508 comprises a negative offset voltage −V_in. The capacitor 508 (floating voltage source) can provide any level of offset voltage between −V_in and zero, in one embodiment.

The filter shown as the inductor 510 and the capacitor 512 smoothes the voltage at node 540 and provides the output voltage V_out at the output terminal 580, in one embodiment. The output voltage at terminal 580 is given by V_out=V_in*d−V_in, where d represents the positive duty cycle of the first driving signal 564.

Figure 5B:
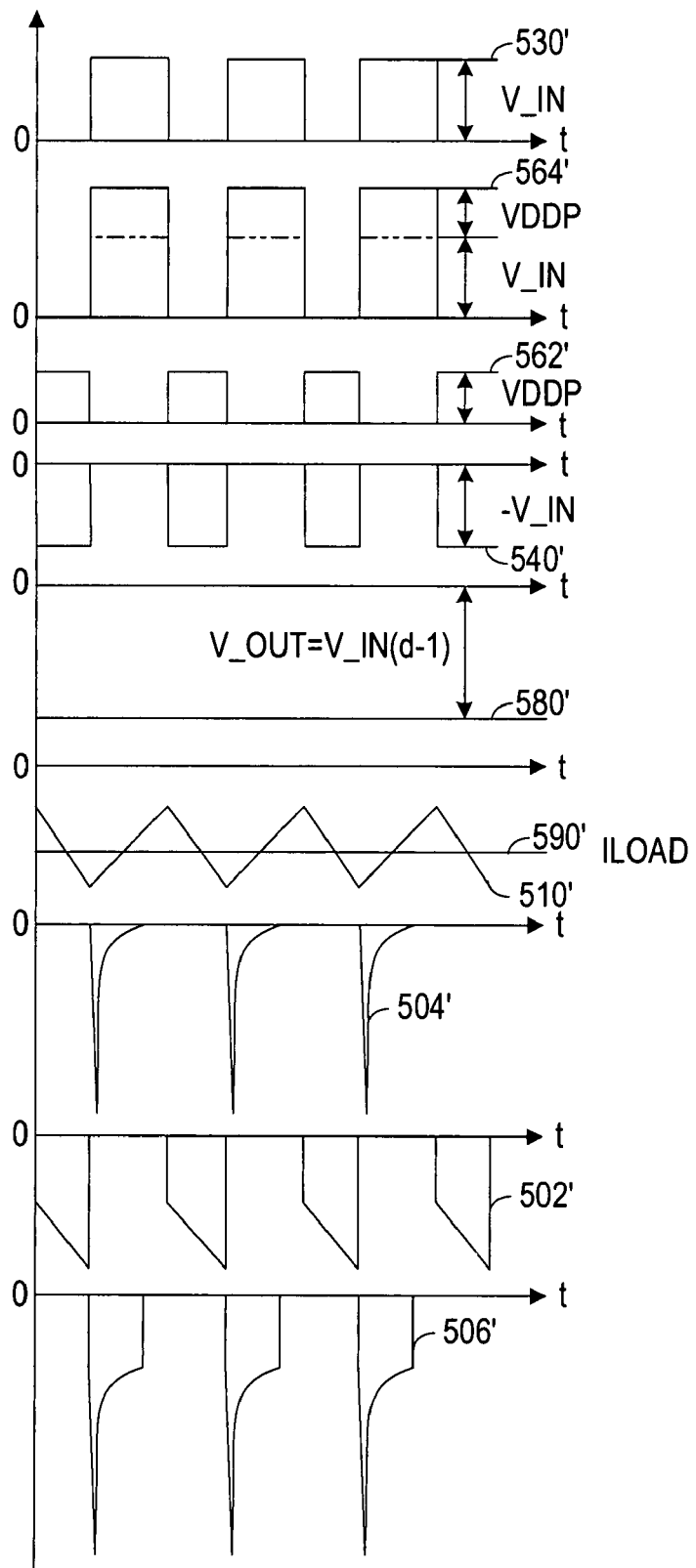
FIG. 5B shows the signal waveforms of signals associated with the polarity changer in FIG. 5A, in accordance with one embodiment of the present invention.

FIG. 5B shows the signal waveforms of signals associated with the polarity changer 500 in FIG. 5A, in accordance with one embodiment of the present invention. FIG. 5B will be described in combination with FIG. 5A.

Waveform 530' represents the voltage at node 530. Waveform 564' represents the voltage of the first driving signal 564. VDDP represents the amplitude of the driving signal of the high side switch 504. Waveform 562' represents the voltage of the second driving signal 562. Waveform 540' represents the voltage at node 540. By comparing waveform 530' and waveform 540', the voltage at node 540 (waveform 540') is equal to the voltage at node offset voltage V_in provided by the floating voltage source 308.

Accordingly, voltage boosters in accordance with the embodiments provided in FIG. 3A, FIG. 4A, and FIG. 4B comprise an output voltage V_out that is directly proportional to the duty cycle of the first driving signal. A regular buck converter controller can be used to drive the voltage boosters in accordance with the present invention, in one embodiment. Other kinds of DC/DC controllers can also be used to drive the voltage boosters in accordance with the present invention, in one embodiment. The controller is used to control the switching circuit. More specifically, the controller is used to generate the first driving signal and the second driving signal. A feedback circuit (e.g., a voltage divider) can be coupled to the output to provide a feedback signal, in one embodiment. In such an embodiment, the feed back signal can be compared with a reference signal to adjust the output voltage.

Advantageously, voltage boosters in accordance with the embodiments provided in FIG. 3A, FIG. 4A, and FIG. 4B utilize a modified buck topology with a 530 (waveform 530') shifted by a negative offset voltage −V_in, in one embodiment.

Waveform 580' represents the output voltage V_out at output terminal 580. As described above, the output voltage V_out is given by: V_out=V_in*d−V_in=V_in(d−1), where d represents the positive duty cycle of the first driving signal 564. Therefore, the output voltage V_out comprises a voltage level that is directly proportional to the duty cycle d of the first driving signal 564. In addition, the output voltage V_out comprises a negative offset voltage −V_in provided by the floating voltage source 508.

Waveform 510' represents the current through the inductor 510. Waveform 590' (load current) represents the current through a load (not shown in FIG. 5A) coupled to the output terminal 580. Waveform 504' represents the current through the high side switch 504. Waveform 502' represents the current through the low side switch 502. Waveform 506' represents the current through the diode 506.

Advantageously, the current through the switches (e.g., the high side switch 504 and the diode 506) is lower (equal to the load current plus the ripple current) compared to the prior art.

Figure 6A:
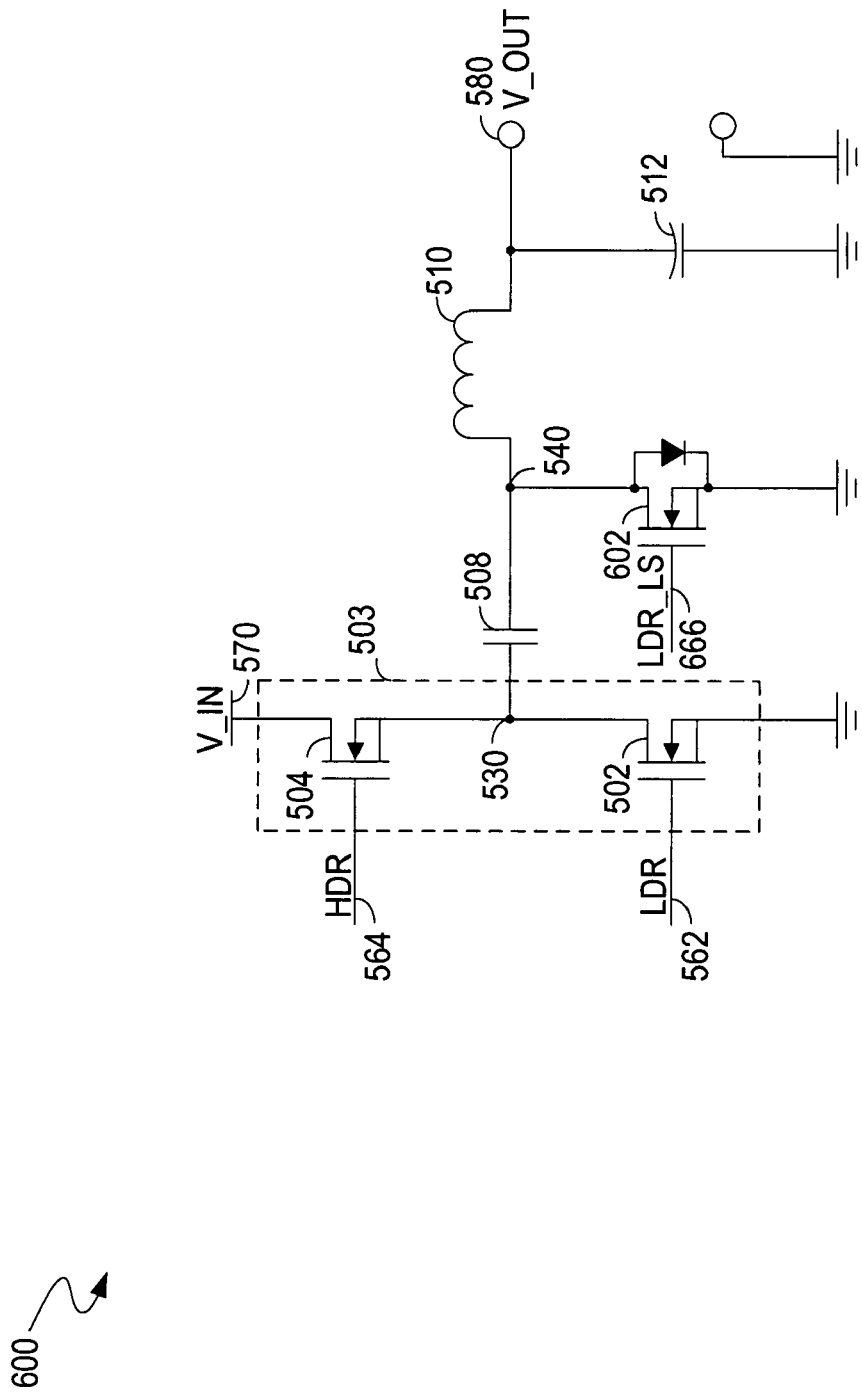
FIG. 6A shows a circuit diagram of a polarity changer, in accordance with one embodiment of the present invention.

FIG. 6A shows a circuit diagram of a polarity changer 600, in accordance with one embodiment of the present invention. Elements that are labeled the same as in FIG. 5A have similar functions and will not be repetitively described herein for purposes of brevity and clarity. The polarity changer 600 utilizes a modified buck topology with a floating voltage source to provide an output voltage. The polarity of the output voltage is opposite to the polarity of the input voltage. The stability issue encountered by conventional boost converters during continuous mode can be avoided, in one embodiment.

As shown in FIG. 6A, a control switch shown as a MOSFET 602 is coupled to the floating source 508 for selectively coupling the floating source 508 to the input 570. As such, the offset voltage provided by the floating source 508 comprises a negative offset voltage V_in.

The control switch 602 is controlled by a pulse width modulation control signal 666. In one embodiment, the control signal 666 and the first driving signal 564 are configured to switch on the control switch 602 and the high side switch 504 simultaneously. As such, the switch 602 and the low side switch 562 are switched on simultaneously, in one embodiment.

Advantageously, the control switch shown as the MOSFET 602 can reduce conduction loss, in one embodiment. The operation of the polarity changer 600 is similar to the operation of the polarity changer 500 in FIG. 5A. Hence, the detailed operation of the polarity changer 600 will not be described herein for purposes of clarity and brevity.

Similarly, the output voltage V_out is obtained by: V_out=V_in(d−1)=V_in*d−V_in, where d represents the positive duty cycle of the first driving signal 564. Therefore, the output voltage comprises a voltage level that is directly proportional to the duty cycle d of the first driving signal 564. In addition, the output voltage V_out comprises a negative offset voltage −V_in provided by the floating voltage source 508.

Figure 6B:
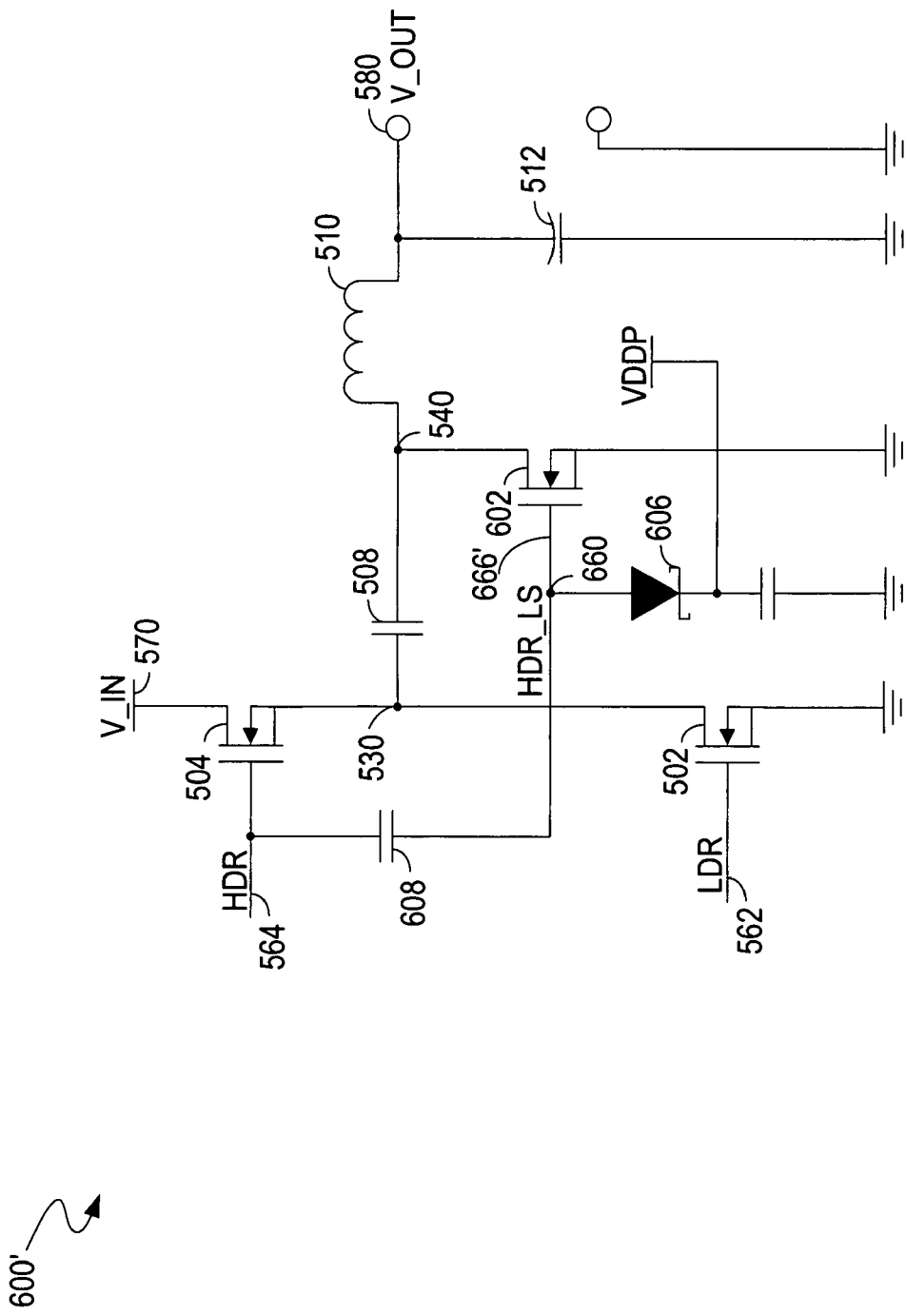
FIG. 6B shows a circuit diagram of a polarity changer, in accordance with one embodiment of the present invention.

FIG. 6B shows a circuit diagram of a polarity changer 600', in accordance with one embodiment of the present invention. Elements that are labeled the same as in FIG. 5A and FIG. 6A have similar functions and will not be repetitively described herein for purposes of brevity and clarity. The polarity changer 600' utilizes a modified buck topology with a floating voltage source to provide an output voltage. The polarity of the output voltage is opposite to the polarity of the input voltage. The stability issue encountered by conventional boost converters during continuous mode can be avoided, in one embodiment.

FIG. 6B provides a simplified control topology (level shifter) for the control switch 602. As shown in FIG. 6B, the gate terminal 660 of the switch 602 is coupled to the first driving signal 564 via a capacitor 608 and is coupled to ground via a diode 606. As such, the control signal 666' for switching the switch 602 is equal to the first driving signal 564 shifted by a negative offset voltage −V_in, in one embodiment.

Similarly, the high side switch 504 and the low side switch 502 are switched on alternately. The high side switch 504 and the control switch 602 are switched on simultaneously, in one embodiment.

The operation of the polarity changer 600' is similar to the operation of the polarity changer 500 in FIG. 5A and the polarity changer 600 in FIG. 6A. Hence, the detailed operation of the polarity changer 600' will not be described herein for purposes of clarity and brevity.

Similarly, the output voltage V_out is obtained by: V_out=V_in(d−1)=V_in*d−V_in, where d represents the positive duty cycle of the first driving signal 564. Therefore, the output voltage comprises a voltage level that is directly proportional to the duty cycle d of the first driving signal 564. In addition, the output voltage V_out comprises a negative offset voltage −V_in provided by the floating voltage source 508.

Figure 6C:
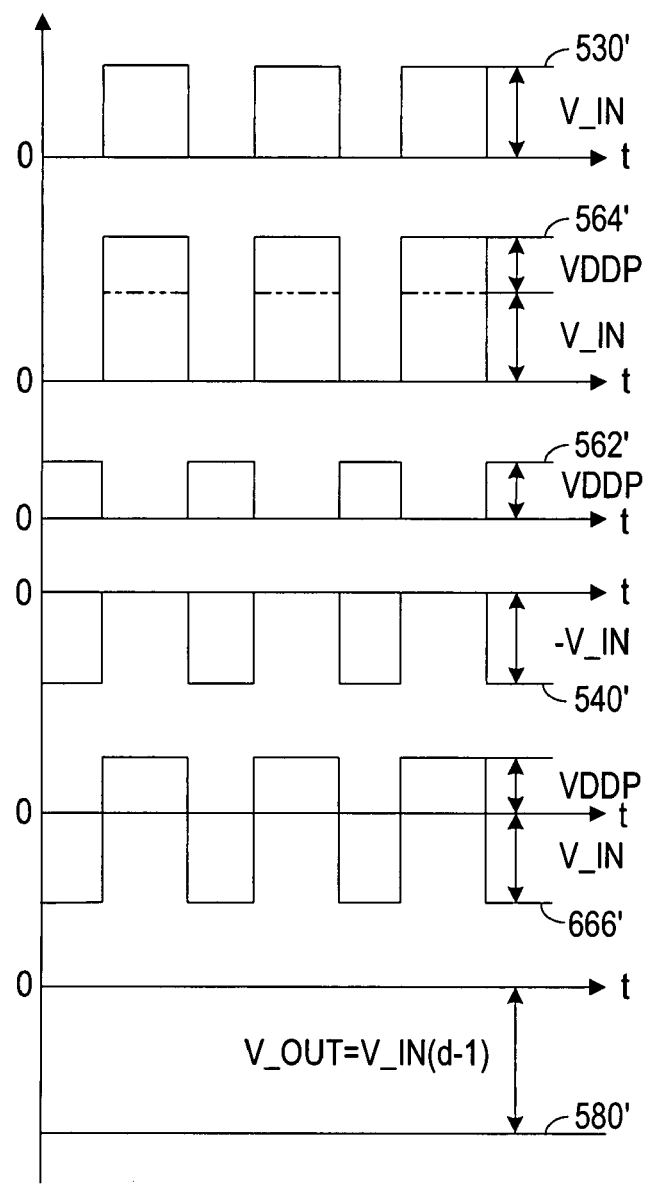
FIG. 6C shows the signal waveforms of signals associated with the polarity changers in FIG. 6A and FIG. 6B, in accordance with one embodiment of the present invention.

FIG. 6C shows the signal waveforms of signals associated with the polarity changer 600 and the polarity changer 600', in accordance with one embodiment of the present invention.

As shown in FIG. 6C, waveform 530' represents the voltage at node 530. Waveform 564' represents the voltage of the first driving signal 564. VDDP represents the amplitude of the driving signal of the high side switch 504. Waveform 562' represents the voltage of the second driving signal 562. Waveform 540' represents the voltage at node 540. By comparing waveform 530' and waveform 540', the voltage at node 540 (waveform 540') is equal to the voltage at node 530 (waveform 530') shifted by a negative offset voltage −V_in, in one embodiment.

Waveform 666' represents the voltage at node 660. As described above, the voltage at node 660 (waveform 666') is equal to the voltage of the first driving signal 564 shifted by a negative offset voltage which is −V_in, in one embodiment. Waveform 580' represents the voltage at the output terminal 580. As described above, the output voltage V_out is obtained by: V_out=V_in(d−1)=V_in*d−V_in, where d represents the positive duty cycle of the first driving signal 564. Therefore, the output voltage comprises a voltage level that is directly proportional to the duty cycle d of the first driving signal 564. In addition, the output voltage V_out comprises a negative offset voltage −V_in provided by the floating voltage source 508.

Accordingly, polarity changers in accordance with the embodiments provided in FIG. 5A, FIG. 6A, and FIG. 6B comprise an output voltage V_out that is directly proportional to the duty cycle of the first driving signal. A modified buck converter controller can be used to drive the polarity changers in accordance with the present invention, in one embodiment. Other kinds of DC/DC controllers can also be used to drive the polarity changers in accordance with the present invention, in one embodiment. The controller is used to control the switching circuit. More specifically, the controller is used to generate the first driving signal and the second driving signal. A feedback circuit (e.g., a voltage divider) can be coupled to the output to provide a feedback signal, in one embodiment. In such an embodiment, the feed back signal can be compared with a reference signal to adjust the output voltage.

Advantageously, polarity changers in accordance with embodiments provided in FIG. 3A, FIG. 4A, and FIG. 4B utilize a modified buck topology with a floating voltage source to provide an output voltage that has an opposite polarity of the input voltage.

Furthermore, the current flowing through the switches of polarity changers in accordance with the embodiments provided in FIG. 3A, FIG. 4A, and FIG. 4B is lower compared to the prior art. As such, polarity changers in accordance with the present invention have high efficiency and are suitable for high current and/or heavy load applications.

Figure 7:
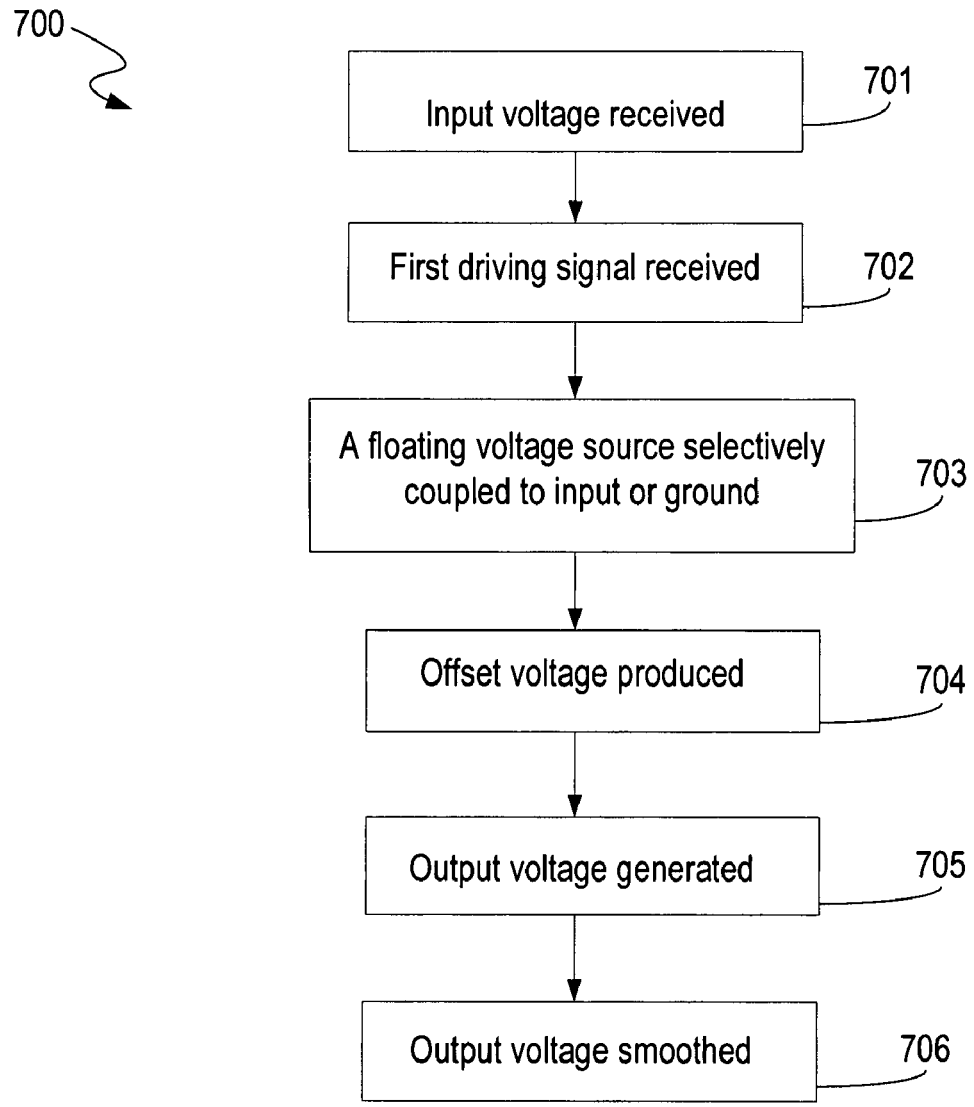
FIG. 7 shows a flowchart of operations performed by a voltage booster and/or a polarity changer, in accordance with one embodiment of the present invention.

FIG. 7 shows a flowchart 700 of the operations performed by a voltage booster such as is described with reference to FIG. 3A-FIG. 4C and/or a polarity changer such as is described with reference to FIG. 5A-FIG. 6C, in accordance with one embodiment of the present invention.

As shown in FIG. 7, an input voltage is received in block 701. In block 702, a first driving signal is received. In one embodiment, the first driving signal is a pulse width modulation signal having a duty cycle d. In block 703, a floating voltage source is selectively coupled to the input or ground. More specifically, when a voltage booster such as is discussed with reference to FIG. 3A-FIG. 4C is implemented, the floating voltage source is selectively coupled to the input. However, when a polarity changer such as is discussed with reference to FIG. 5A-FIG. 6C is implemented, the floating voltage source is selectively coupled to ground.

In block 704, an offset voltage is generated by the floating voltage source. More specifically, if the floating voltage source is selectively coupled to the input, the floating voltage source provides a positive offset voltage V_in. If the floating voltage source is selectively coupled to ground, the floating voltage source provides a negative offset voltage −V_in.

In block 705, an output voltage is generated. In block 706, the output voltage is smoothed by a filter comprising an inductor and a capacitor. Advantageously, this output voltage has a voltage level that is directly proportional to the duty cycle d of the first driving signal.

Figure 8:
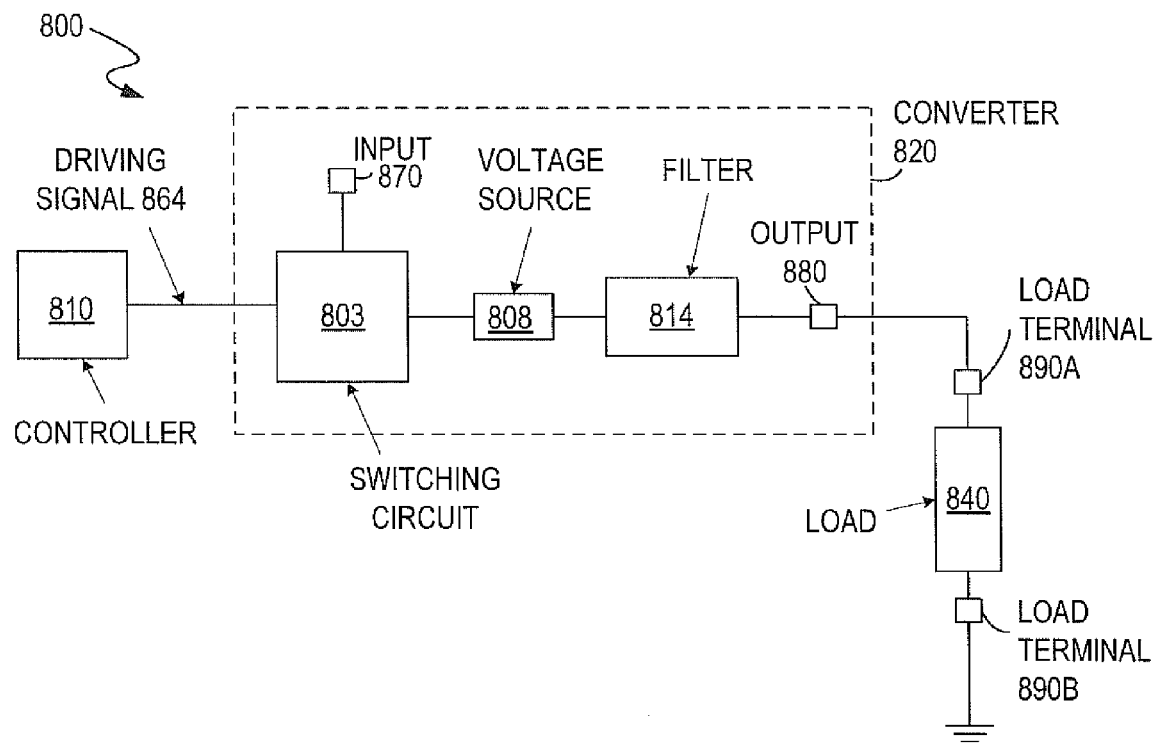
FIG. 8 shows components of an electronic device comprising a voltage booster or a polarity changer, in accordance with one embodiment of the present invention.

FIG. 8 shows components of an electronic device 800 that includes a voltage booster or a polarity changer, in accordance with one embodiment of the present invention. The electronic device may include, but is not limited to, a desktop computer, a laptop computer, and a personal digital device, etc.

As shown in FIG. 8, the components of an electronic device 800 include a converter 820, a controller 810, and load terminals 890A and 890B. In the electronic device 800, the converter 820 is controlled by the controller 810 and converts an input signal at the input 870 to an output signal at the converter output 880 for powering a load 840. In one embodiment, the converter 820 can include a voltage booster as discussed with reference to FIG. 3A-FIG. 4C. In another embodiment, the converter 820 can include a polarity changer as discussed with reference to FIG. 5A-FIG. 6C. The voltage booster and the polarity changer are described in detail above. Hence, a repetitive description will be omitted herein for purposes of brevity and clarity.

The converter 820 comprises an input 870 that receives an input voltage, a switching circuit 803 coupled to the input 870 for receiving a first driving signal 864 having a duty cycle; a floating voltage source 808 coupled to the switching circuit 803 for producing an offset voltage, and a converter output 880 coupled to the floating voltage source 808 for generating an output voltage. The converter output 880 is coupled to the floating voltage source 808 via a filter 814, in one embodiment. Advantageously, the output voltage has a voltage level that is directly proportional to the duty cycle of the first driving signal 864.

The controller 810 is coupled to the switching circuit 803 for providing the first driving signal 864 to the switching circuit 803. In one embodiment, the first driving signal 864 is a pulse width modulation signal having a duty cycle d.

The converter output 880 is coupled to the load terminal 890A for providing an output voltage to a load 840. As such, in an electronic device, the converter 820 is controlled by the controller 810 and converts an input signal at the input 870 to an output signal at the converter output 880 for powering the load 840.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A converter comprising:
   an input for receiving an input voltage;
   a switching circuit coupled to said input for receiving a first driving signal, wherein said first driving signal has a duty cycle;
   a floating voltage source coupled to said switching circuit for producing an offset voltage between zero and said input voltage;
   a control switch coupled to said floating voltage source for selectively coupling said floating voltage source to said input; and
   an output coupled to said floating voltage source for generating an output voltage, wherein said output voltage comprises said offset voltage and a voltage level that is directly proportional to said duty cycle.

2. The converter as claimed in claim 1, further comprising a filter coupled to said floating voltage source for smoothing said output voltage.

3. The converter as claimed in claim 2, wherein said filter comprises an inductor.

4. The converter as claimed in claim 2, wherein said filter comprises a capacitor.

5. The converter as claimed in claim 1, wherein said floating voltage source comprises a capacitor.

6. The converter as claimed in claim 1, wherein said offset voltage comprises a positive value of said input voltage.

7. The converter as claimed in claim 1, wherein said output voltage is greater than said input voltage.

8. Then converter as claimed in claim 1, wherein said control switch and a switch controlled by said first driving signal are switched on alternately.

9. The converter as claimed in claim 1, wherein said switching circuit comprises a half bridge circuit.

10. A converter comprising:
    an input for receiving an input voltage;
    a switching circuit coupled to said input for receiving a first driving signal, wherein said first driving signal has a duty cycle;
    a floating voltage source coupled to said switching circuit for producing an offset voltage;
    a control switch coupled to said floating voltage source for selectively coupling said floating voltage source to ground; and
    an output coupled to said floating voltage source for generating an output voltage, wherein said output voltage comprises said offset voltage and a voltage level that is directly proportional to said duty cycle.

11. The converter as claimed in claim 10, wherein said offset voltage comprises a negative value of said input voltage.

12. Then converter as claimed in claim 10, wherein said control switch and a switch controlled by said first driving signal are switched on simultaneously.

13. The converter as claimed in claim 10, wherein a polarity of said output voltage is opposite to a polarity of said input voltage.

14. The converter as claimed in claim 10, wherein said switching circuit comprises a half bridge circuit.

15. The converter as claimed in claim 10, further comprising a filter coupled to said floating voltage source for smoothing said output voltage.

16. A method for converting a signal comprising:
    receiving an input voltage;
    receiving a first driving signal, wherein said first driving signal has a duty cycle;
    producing an offset voltage between zero and said input voltage;
    selectively coupling a floating voltage source to an input; and
    generating an output voltage, wherein said output voltage comprises said offset voltage and a voltage level that is directly proportional to said duty cycle.

17. The method as claimed in claim 16, further comprising smoothing said output voltage.

18. An electronic device comprising:
    a converter comprising:
      an input receiving an input voltage;
      a switching circuit coupled to said input for receiving a first driving signal, wherein said first driving signal has a duty cycle;
      a floating voltage source coupled to said switching circuit for producing a negative offset voltage;
      a control switch coupled to said floating voltage source for selectively coupling said floating source to ground; and
      a converter output coupled to said floating voltage source for generating an output voltage, wherein said output voltage comprises said positive offset voltage and a voltage level that is directly proportional to said duty cycle;
    a controller coupled to said switching circuit for generating said first driving signal; and
    load terminals for providing an output to a load.

19. A method for converting a signal comprising:
    receiving an input voltage;
    receiving a first driving signal, wherein said first driving signal has a duty cycle;
    producing an offset voltage;
    selectively coupling a floating voltage source to ground; and generating an output voltage, wherein said output voltage comprises said offset voltage and a voltage level that is directly proportional to said duty cycle.

20. An electronic device comprising:

a converter comprising:

an input receiving an input voltage;

a switching circuit coupled to said input for receiving a first driving signal, wherein said first driving signal has a duty cycle;

a floating voltage source coupled to said switching circuit for producing a positive offset voltage between zero and said input voltage;

a control switch coupled to said floating voltage source for selectively coupling said floating voltage source to said input; and a converter output coupled to said floating voltage source for generating an output voltage, wherein said output voltage comprises a voltage level that is directly proportional to said duty cycle and said positive offset voltage;

a controller coupled to said switching circuit for generating said first driving signal; and load terminals for providing an output to a load.

* * * * *